United States Patent [19]

Marioni

[11] 4,091,132

[45] May 23, 1978

[54] MULTICOLORED GLASS OBJECTS AND PROCESS FOR PRODUCTION

[76] Inventor: Peter Paul Marioni, 1712 Elm, Richmond, Calif. 94805

[21] Appl. No.: 647,668

[22] Filed: Jan. 9, 1976

[51] Int. Cl.² .................... B32B 17/06; C03B 23/20
[52] U.S. Cl. .................................. 428/35; 65/42; 65/46; 428/428
[58] Field of Search .............. 65/36, 42, 67, 45, 46, 65/47, 48; 428/35, 428

[56] References Cited

U.S. PATENT DOCUMENTS

| | | | |
|---|---|---|---|
| 1,583,441 | 5/1926 | Blenko | 65/67 |
| 2,183,961 | 12/1939 | Fischer | 65/46 |

FOREIGN PATENT DOCUMENTS 2,094 of 1899 United Kingdom ............... 65/67

*Primary Examiner*—Arthur D. Kellogg
*Attorney, Agent, or Firm*—Warren, Chickering & Grunewald

[57] ABSTRACT

There is disclosed a process for producing continuous, multicolored glass objects, such as stained glass windows without leading, which includes blowing a glass object, maintaining at least one colored pattern piece in contact with the surface of the object until the pattern piece becomes soft enough to be blown and then blowing the object to a final form whereby the pattern piece becomes incorporated in the glass object. Sheet material may be produced by blowing a cylinder, splitting the cylinder and flattening the cylindrical wall.

11 Claims, 1 Drawing Figure

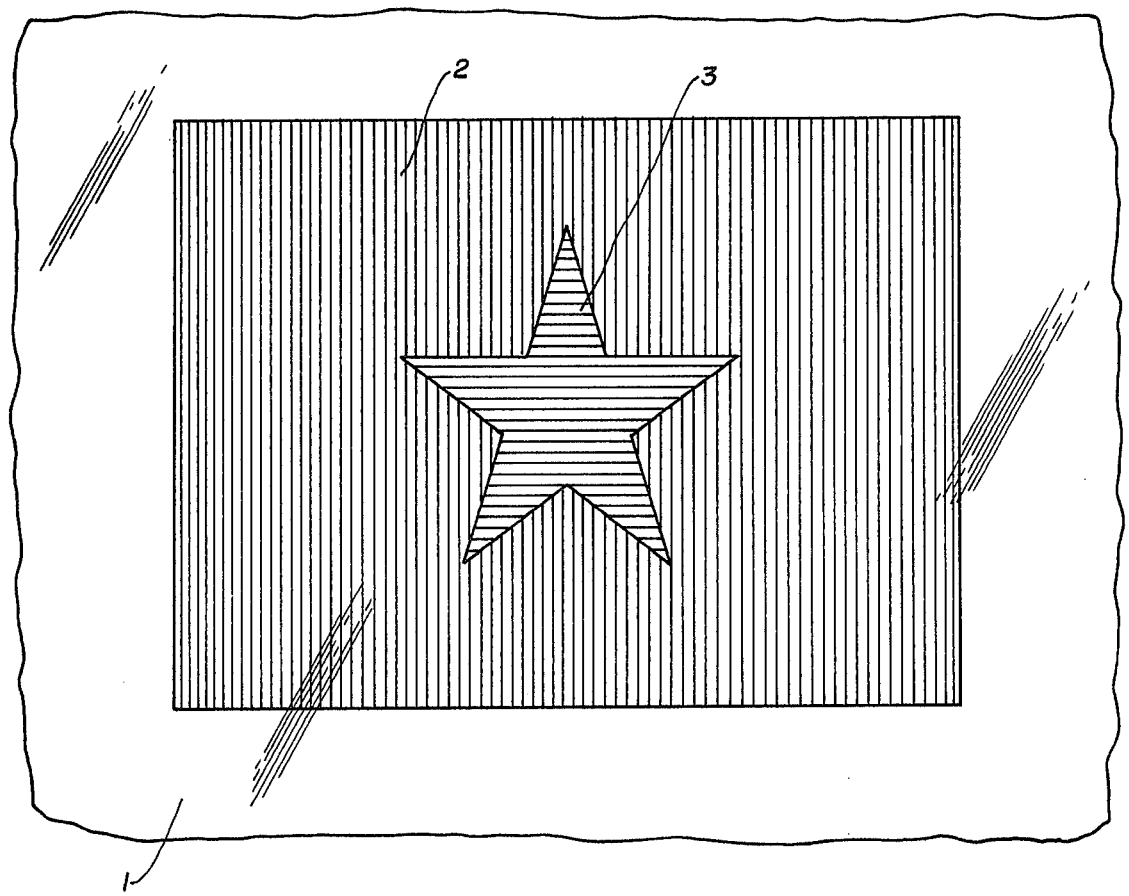

MULTICOLORED GLASS OBJECTS AND PROCESS FOR PRODUCTION

BACKGROUND OF THE INVENTION

Production of colored glass objects is an ancient art. Objects such as vases characteristically are all of a single color. Multicolored vases are made, but usually the different colors are in compact masses, such as a colored vase having a transparent handle. Multicolored vases also may be made by swirling one color of glass within another or by adding colored pieces such as medallions to protrude above the surface of the object itself.

Multicolored glass objects such as stained glass windows also have been made, and these are characteristically produced by holding variously colored pieces of glass in the desired relationship to one another by embedding their edges in channels of lead or other malleable metal.

Although it is desirable, there is no medium by which multicolored glass objects having distinct patterns can be made with smooth surfaces and as a continuous glass object having the pattern integral with the rest of the object. This is particularly true of objects in the form of flat panes of glass of ordinary sizes such as those that can be installed as windows.

In this specification and the appended claims, the term color is used in its usual sense as well as in a sense associated with glass. It is defined as either transparent or opaque glass elements of varying colors and includes opaque white glass, which is readily distinguishable from transparent glass.

The term pattern as used herein is defined as a deliberately made, distinct form or shape and includes representations of objects, animals, trees, persons, scenes and the like, as well as geometric shapes. Normally, an arbitrary form caused by swirling or running different colored glasses together is not a pattern in the sense of this invention.

THE INVENTION

This invention is a method for producing a continuous glass object which includes an integral colored pattern. The invention also includes the article produced by the process.

The process of this invention is one for forming a continuous, smooth-surfaced stained glass object, and it includes a first step of forming a gather of glass on the end of a blowpipe at a temperature at which it can be blown. The gather of glass is blown to form an initial hollow object which is maintained at a temperature at which it can be blown while a colored pattern piece is placed in contact with its surface. The colored pattern piece is maintained in contact with the surface until it softens to a blowable condition, after which the initial hollow object is again blown to form a second hollow object, which may or may not be the final article produced by the process. The process of this invention as hereinafter more fully described produces a continuous, one-piece glass object having a distinct, sharply outlined colored pattern incorporated within it.

The first step of the process is well known in the art. Glass is a supercooled liquid which does not exhibit a distinct melting point, but becomes more and more plastic as its temperature increases. The art of glass blowing is very old, and it is well known in that art to heat glass until it is in the proper condition to be accumulated on the end of a blowpipe with the proper viscosity to be blown. An accumulation of glass on the end of a blowpipe is known as a gather.

Skilled craftsmen are capable of blowing a gather of glass to form a hollow object of substantially any shape, such as a cylinder, a sphere, or various other curved surfaces to form such objects as vases, stemware, laboratory equipment or the like. Molds may be used along with glass blowing techniques to form objects to accurate dimensions or to form them more quickly. For example, a gather of glass may be positioned within a cylindrical mold and blown so that the glass contacts the interior surface of the mold to form a cylindrical glass object of the proper diameter. In the process of the present invention, the glass is blown more than once, and it is within the scope of this invention to employ different cylindrical molds of different diameters so that both initial and final objects of cylindrical shape can be produced.

A colored pattern piece, as that term is used in this description, is a separate piece of glass that is readily distinguishable from the hollow object by color or opaqueness. Separate pattern pieces are readily made by known glass cutting, sandblasting or casting techniques. These pattern pieces can be formed as geometric shapes or as representations of clouds, trees, animals, persons, fences, houses or the like. In constructing representations on an object of this invention, the representations may be made by use of multiple pattern pieces, which may be placed to abut one another, to overlap or to superimpose one another.

Pattern pieces useful in the process of this invention may be thin or thick, lightly or densely colored, opaque or transparent and may be used alone or in combination. The pattern pieces applied to the initial blown object adhere to it because the initial blown object is tacky, soft glass. When in contact with hot glass, the pattern pieces themselves become soft, and when the glass is further blown to form a second blown object, the pattern pieces become integral with the glass of the first blown object. The result is a seamless, one-piece object.

In a preferred embodiment of the invention, the pattern pieces are heated before applying them to the blown glass object. Preheating the pattern pieces avoids thermal shock and insures that the pattern piece will be at a temperature suitable for blowing. It is preferred that all pattern pieces be preheated, before being applied, to the point where they are beginning to soften, and it is particularly desirable to preheat thicker pattern pieces so that too much heat will not be extracted from the blown object to raise the temperature of the pattern piece to a softening temperature.

When the object is further blown after the pattern piece is in place, the pattern piece may expand. If it expands in all directions equally, the general shape of the pattern piece will not change. If the pattern piece is blown to expand in one direction only, for example, when the hollow object is a cylinder and subsequent blowing increases its diameter but not its length, the length to width proportions of the pattern piece will change during subsequent blowing. Accommodation to such changes in shape may be made by selecting the appropriate shaped pattern piece in the first instance. For example, if the ultimate pattern in the final blown glass object is to be a square, it will be necessary to apply a rectangular pattern piece to the initial blown glass object so that expansion in its width but not its length will result in the production of a square.

In another embodiment of the invention, the blown glass object, with its pattern piece in place, may be covered with another gather before it is blown to its final shape. In this embodiment of the invention, a final object is produced which is a one-piece glass object having a layer of glass on both sides of the pattern piece.

The process of the present invention may be employed to produce unique panes of glass in the form of stained glass windows without leading. Such panes are made by blowing an initial hollow object in the form of a cylinder, adding one or more pattern pieces in an appropriate pattern to form a representation on the surface of the cylinder, forming at least a second hollow object by further blowing, with the second hollow object also in the form of a cylinder, and then opening the ends of the cylinder, splitting it on a line parallel to its longitudinal axis, heating the cylinder to a softening temperature and then rolling it flat to form a glass pane. The technique for splitting and rolling cylindrical glass pieces is known to the art. By the process described hereinabove, a pane of glass can be formed with a single colored object, such as a tree, in the center of a transparent piece of glass. Obviously, other patterns may be employed which cover all or substantially all of the pane of glass as well as patterns that may be formed of a background of colored glass with a transparent object in the center.

As stated hereinabove, the invention is also manifested in the form of a continuous glass article having a smooth surface and an integral colored pattern. In other words, a one-piece glass article which includes a pattern of a different color or texture.

DETAILED DESCRIPTION OF THE INVENTION

One process embodying this invention includes preparing a molten mass of transparent glass and maintaining it at a temperature at which it is liquid and of suitable viscosity to be blown. A gather of glass is placed on the end of a blowpipe, and it is blown to a cylindrical shape, with or without the use of a mold, to form an initial hollow object.

While the glass is still hot enough to be blown, a thin pattern piece in the form of a square and made of pale red glass is preheated to its softening temperature and placed on the cylindrical surface of the first hollow object. The pattern piece adheres firmly to the surface. The initial hollow object with the pattern piece in place may then be reheated, if necessary, or if not necessary it may be blown further to form a second hollow object which is in the form of a cylinder of larger diameter than the first hollow object. This cylinder is a one-piece cylindrical article having an integral red rectangle on its surface.

Another pattern piece in the shape of a blue star is then preheated to softness and placed on the surface of the second hollow object in the center of the red rectangle. The second hollow object is then dipped to take on another gather of glass and is again blown to a slightly larger cylinder to form a final cylindrical hollow object.

The final object is in the form of a transparent glass cylinder having a red rectangle on its cylindrical surface and having a blue star in the center of the red rectangle. This final object is cut first to remove the closed ends, and then the cylinder is split on a line parallel to its longitudinal axis and diametrically opposite the center of the blue star. The cylinder is then heated to its softening point, opened along the cut wall and then rolled flat. The flat piece is then cooled to harden it and annealed if necessary. The final product is a flat plate of transparent glass having a blue star on a red rectangle positioned in its center.

The accompanying drawing illustrates a partial view of the article made as described above. The portion designated 1 is a flat pane of transparent glass. The portion designated 2 is the rectangular red background, and the portion designated 3 is the blue star.

What is claimed is:

1. A process for forming a continuous, smooth-surfaced, multicolored glass object comprising:
    A. forming a gather of glass at a temperature at which it can be blown,
    B. blowing an initial hollow object from the gather,
    C. placing a colored pattern piece in contact with the surface of the initial object while said initial object is at a temperature at which it can be blown,
    D. maintaining the pattern piece in contact with the surface of the initial object for a time sufficient for the pattern piece to reach a temperature at which it can be blown, and
    E. blowing the initial hollow object only to the extent to produce a second hollow object having said pattern piece integral therewith and said second hollow object having a size and shape such that said pattern piece has a predetermined shape which is not substantially distorted from the original shape of said pattern piece.

2. The process of claim 1 wherein the final hollow object is a cylindrical object.

3. The process of claim 2 wherein the cylindrical object is split and unrolled to form a sheet.

4. The process of claim 1 wherein said pattern piece is heated before it is placed in contact with the initial hollow object.

5. The process of claim 1 wherein said initial hollow object is coated with another gather before said second hollow object is produced.

6. The process of claim 1 wherein said second hollow object is coated with a gather of glass and blown to produce a third hollow object.

7. The process of claim 1 wherein a plurality of pattern pieces are employed to form a pattern.

8. An article comprising a continuous, smooth-surfaced, glass membrane including an integral colored pattern and made by the process of claim 1.

9. The article of claim 8 including a transparent glass membrane surrounding said pattern.

10. The article of claim 8 in the form of a flat sheet.

11. The process of claim 1 wherein said pattern piece is produced by sandblasting.

* * * * *